Figure 1:
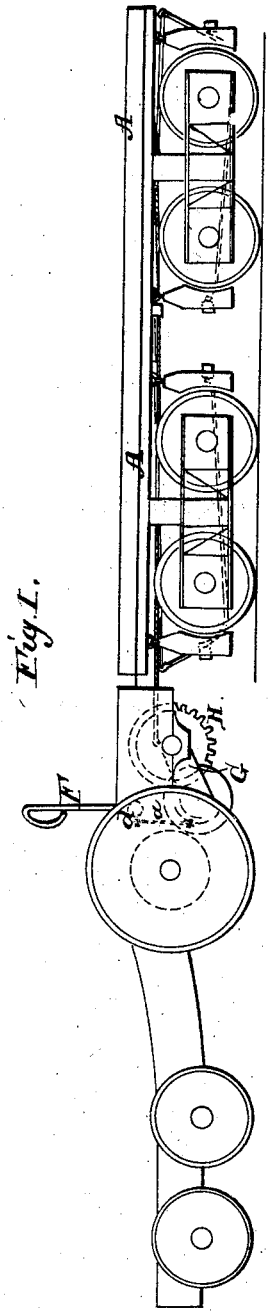
Figure 2:
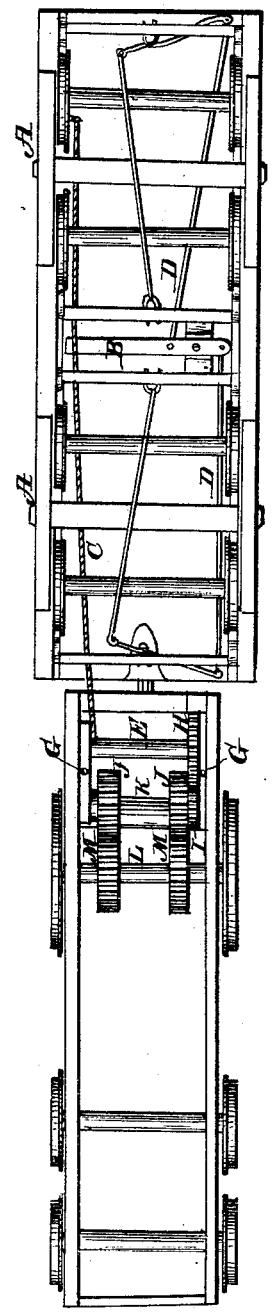

J. L. BARNES.
Car Brake.

No. 69,892.

Patented Oct. 15, 1867.

Witnesses:

Inventor:

United States Patent Office.

JOHN L. BARNES, OF ETNA GREEN, INDIANA.

Letters Patent No. 69,892, dated October 15, 1867.

---

IMPROVED CAR-BRAKE.

---

The Schedule referred to in these Letters Patent and making part of the same.

---

TO ALL WHOM IT MAY CONCERN:

Be it known that I, J. L. BARNES, of Etna Green, in the county of Kosciusko, and in the State of Indiana, have invented certain new and useful improvement in Brake-Power for Railroads; and do hereby declare that the following is a full, clear, and exact description thereof, reference being had to the accompanying drawings, and to the letters of reference marked thereon.

In the annexed drawings, making part of this specification, A A represent two trucks of a railroad car. Between these trucks, and secured to the bottom of the car, is a lever, B, upon each side of the fulcrum of which are secured two rods, D D, which connect with the brake-bars of the trucks. A cord, C, is connected to the long end of the lever B, and said cord runs forward and is secured to a shaft, E, on the engine. When this cord is wound around the shaft, as will be described, the brakes are applied to the wheels of the trucks through the lever B and rods D D. Secured beneath the engine is a frame, G, which is pivoted at one side by means of the shaft E to the engine frame. The other side of the frame G plays loosely, and is controlled by a cord or chain, $a$. H represents a gear-wheel, which is secured permanently upon shaft E. K represents a shaft, which has its bearings in the loose end of the frame, and said shaft is provided with two friction-wheels, J J, and also with a pinion, I, which takes into the gear-wheel H of shaft E. The driving-wheel shaft is provided with two friction-wheels, M M, which are intended, when desirable, to bear against the wheels J J of frame G. $d$ represents a roller, which is located above the loose end of the frame G, and having suitable bearings in the engine frame, and $a$ represents a cord or chain, which has one end attached to said roller $d$, and the other end attached to the loose end of the frame G. F represents a lever, which has one end secured to the roller $d$. By moving the upper end of the lever forward or backward the roller $d$ is partially rotated, winding upon it the cord $a$. When the cord is wound up it draws the frame G up so that it throws the wheels J J in contact with the wheels M M, and by friction causes said wheels J J to revolve, at the same time causing the pinion I to revolve, as it is fast upon shaft K. This pinion I causes the wheel H to revolve, and with it the shaft E, thus winding the cord C around said shaft and applying the brakes, as has been set forth. When the lever F is moved so as to unwind cord or chain $a$, the wheels M and J are thrown out of contact and the brakes are relieved. The brakes may be made to operate in like manner by a little shifting of the brake-rods when the cars are made to run backwards, or in an opposite direction.

Having thus fully described my invention, what I claim as new, and desire to secure by Letters Patent, is—

The swinging frame G, with its shafts E and K, wheels J J, gears H and I, used in combination with wheels M M upon the driving-axle, and cords C, rods D D, and lever B, for operating the carriage-brakes by means of the lever F, roller $d$, and cord $a$, when arranged in the manner and used substantially as and for the purposes specified.

In testimony that I claim the foregoing I have hereunto set my hand this 2d day of April, 1867.

JOHN L. BARNES.

Witnesses:
B. G. COSGROVE,
W. M. COSGROVE.